United States Patent
Jones

(10) Patent No.: US 10,113,283 B1
(45) Date of Patent: Oct. 30, 2018

(54) SNOW DISCHARGE DIVERTER APPARATUS AND METHOD

(71) Applicant: Charles M. Jones, Woodridge, IL (US)

(72) Inventor: Charles M. Jones, Woodridge, IL (US)

(*) Notice: Subject to any disclaimer, the term of this patent is extended or adjusted under 35 U.S.C. 154(b) by 168 days.

(21) Appl. No.: 15/215,623

(22) Filed: Jul. 21, 2016

(51) Int. Cl.
  *E01H 5/00* (2006.01)
  *E01H 5/06* (2006.01)
  *E01H 5/09* (2006.01)
  *G01S 19/14* (2010.01)

(52) U.S. Cl.
  CPC .......... *E01H 5/066* (2013.01); *E01H 5/061* (2013.01); *E01H 5/098* (2013.01); *G01S 19/14* (2013.01)

(58) Field of Classification Search
  CPC ......... E01H 5/066; E01H 5/098; E01H 5/061; G01S 19/14
  See application file for complete search history.

(56) References Cited

U.S. PATENT DOCUMENTS

| | | | |
|---|---|---|---|
| 4,614,048 A | 9/1986 | Melby | |
| 5,903,986 A | 5/1999 | Parker | |
| 5,904,296 A * | 5/1999 | Doherty | A01C 17/00 239/61 |
| 6,104,980 A * | 8/2000 | Sato | E01C 19/004 340/988 |
| 6,173,904 B1 * | 1/2001 | Doherty | A01C 17/00 239/1 |
| 6,249,992 B1 | 6/2001 | Irving et al. | |
| 7,681,337 B2 | 3/2010 | Watson | |
| 7,730,644 B2 | 6/2010 | Frey et al. | |
| 7,779,563 B2 | 8/2010 | Mills | |
| 7,839,301 B2 * | 11/2010 | Doherty | E01H 10/007 239/1 |
| 8,051,587 B2 | 11/2011 | Mills | |
| 8,522,458 B2 * | 9/2013 | Gendreau | E01H 5/066 37/280 |
| 8,887,412 B2 * | 11/2014 | Proeber | E02F 3/841 37/197 |
| 9,085,859 B2 | 7/2015 | Andic | |
| 9,518,376 B1 * | 12/2016 | Shirchenko | E02F 3/844 |
| 9,624,634 B2 * | 4/2017 | Andic | E01H 5/06 |
| 2007/0068049 A1 * | 3/2007 | Quenzi | E01H 5/066 37/274 |
| 2008/0155865 A1 * | 7/2008 | Mills | E01H 5/066 37/275 |
| 2009/0090032 A1 * | 4/2009 | Yang | E01H 5/06 37/234 |
| 2011/0113657 A1 * | 5/2011 | Mills | E01H 5/066 37/266 |
| 2012/0124868 A1 * | 5/2012 | Gendreau | E01H 5/066 37/266 |

(Continued)

*Primary Examiner* — Peter D Nolan

(57) ABSTRACT

The plowing of streets and roadways in areas with snowy climates is typically done with a labor intensive, manually operated snow removal apparatus mounted on a vehicle designed to push the snow off the roadway. A problem is that there may be areas near the roadway, such as, driveways, mailboxes, crosswalks, cross streets, and fire hydrants that should not be blocked or covered with discharged snow. The present inventions are an apparatus and a method by which the snow removal apparatus can be operated automatically without the need for manual intervention, to avoid throwing discharged snow on areas that would be undesirable to block or cover with snow.

26 Claims, 9 Drawing Sheets

(56) References Cited

U.S. PATENT DOCUMENTS

2012/0246977 A1* 10/2012 Proeber .................. E02F 3/841
                                                              37/197
2015/0252543 A1*  9/2015 Andic ...................... E01H 5/06
                                                              37/274
2017/0328021 A1* 11/2017 Miller ..................... E01H 5/066

* cited by examiner

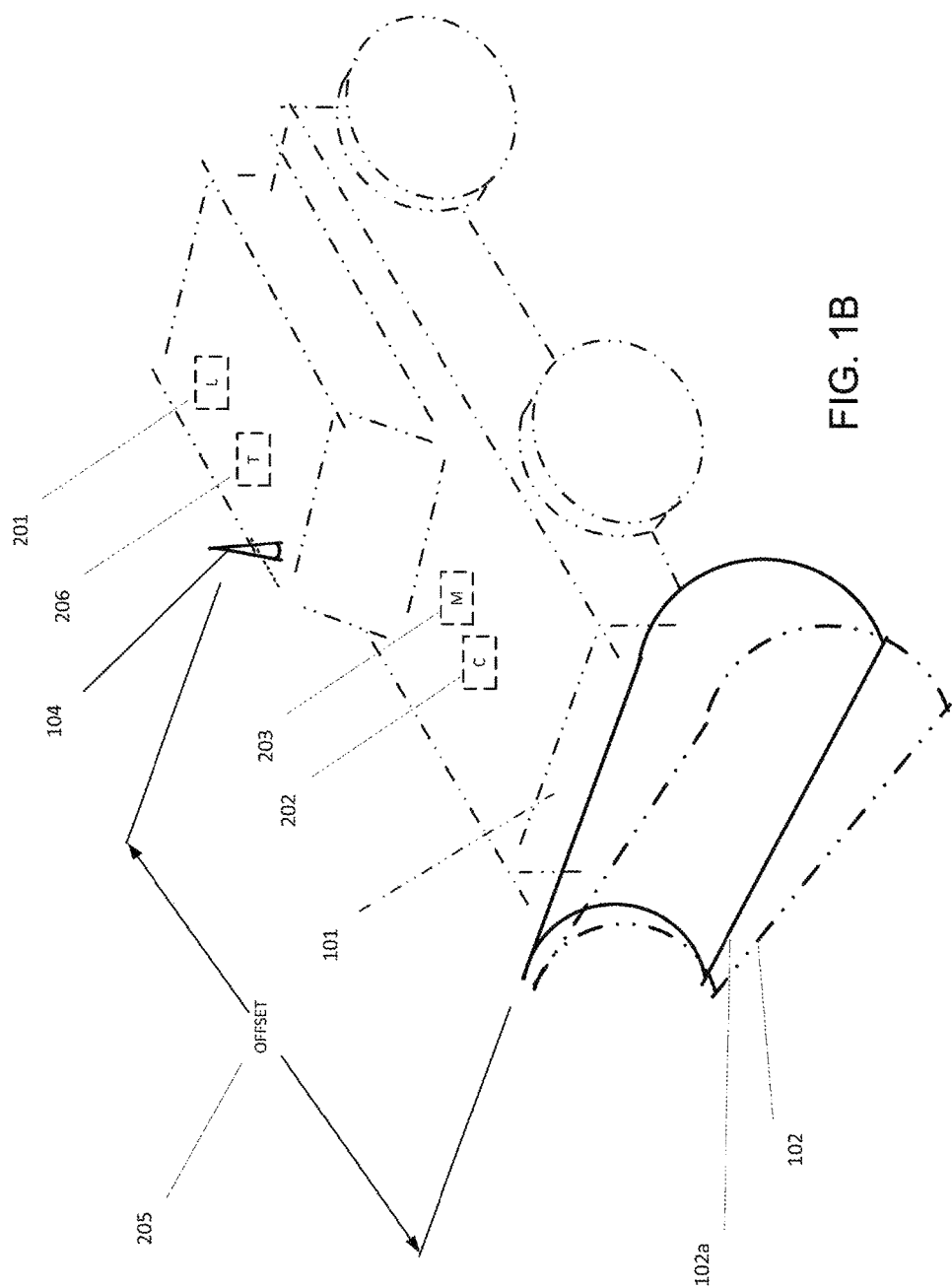

US 10,113,283 B1

SNOW DISCHARGE DIVERTER APPARATUS AND METHOD

BACKGROUND OF THE INVENTIONS

1. Technical Field

The present inventions relate to snow removal and, more particularly, relate to selectively avoiding snow removal discharge.

2. Background of the Invention

Cities and towns that receive significant snowfalls have a problem when removing snow from their streets and roadways. The typical snow removal operation utilizes a snow removal vehicle with a blade or a blade with a snow flow diverter or a blower to push or blow the snow off their streets. A problem is that there are a number of areas near the streets, such as driveways, mailboxes, crosswalks, or fire hydrants that should not be covered by the plowed snow. Unfortunately these areas are typically covered or hidden or blocked by the plowed snow during the normal snow plowing operation. Home owners that have had to re-shovel the end of their driveway after the snow plow passes have stressful work to perform. Some have even had heart attacks as a result of this stress. Some of those have even died. The postal service, in some northern cities, refuses to deliver mail if the access area to a mail box has not been cleared of snow. Fire hydrants that have been covered with plowed snow are difficult for the fire department to find and to access when needed to fight a nearby fire. Plows that leave a ridge of snow on a cross street or cross walk make it more difficult to drive or walk over. Efforts have been made to mitigate the problem of discharging plowed snow on areas that should be avoided. These efforts typically involve some form of manually operated adjustable snow diverter apparatus. Some include an audio or video warning of an area to avoid, giving the vehicle operator time to take manual action. Some have tried to automate the adjustable snow diverter apparatus to eliminate the need for manual interaction. In this setting it would be desirable to solve the above problem by automating the adjustable snow diverter apparatus thus eliminating the need for manual interaction of the vehicle operator.

BRIEF SUMMARY OF THE INVENTION

The present invention addresses problems in the current art by providing a snow discharge diverter apparatus that is incorporated into a snow removal vehicle and will alter the snow discharge direction when the snow removal vehicle passes by a predefined area, such as a driveway, a mailbox, or a fire hydrant, etc. with no action required of the vehicle operator. When the vehicle passes by the area the snow will not be thrown on or in front of the predefined area but will be pushed past the area and then thrown over the edge of the street or roadway. The present invention also allows the use of highly accurate GPS systems or less accurate (and less expensive) GPS systems to determine the location of the snow removal vehicle. The present invention eliminates elements of apparatuses in prior art that attempt to automate the process.

BRIEF DESCRIPTION OF THE DRAWINGS

The present inventions are illustrated by way of example and are not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein:

FIG. 1B illustrates a schematic perspective illustration of a snow removal vehicle with the second form of a snow diverter apparatus, a rotatable snow plow blade in the snow discharge position shown with phantom lines and in the snow pushing position according to embodiments of the present inventions;

DETAILED DESCRIPTION OF THE PREFERRED EMBODIMENTS

Figure 1A:
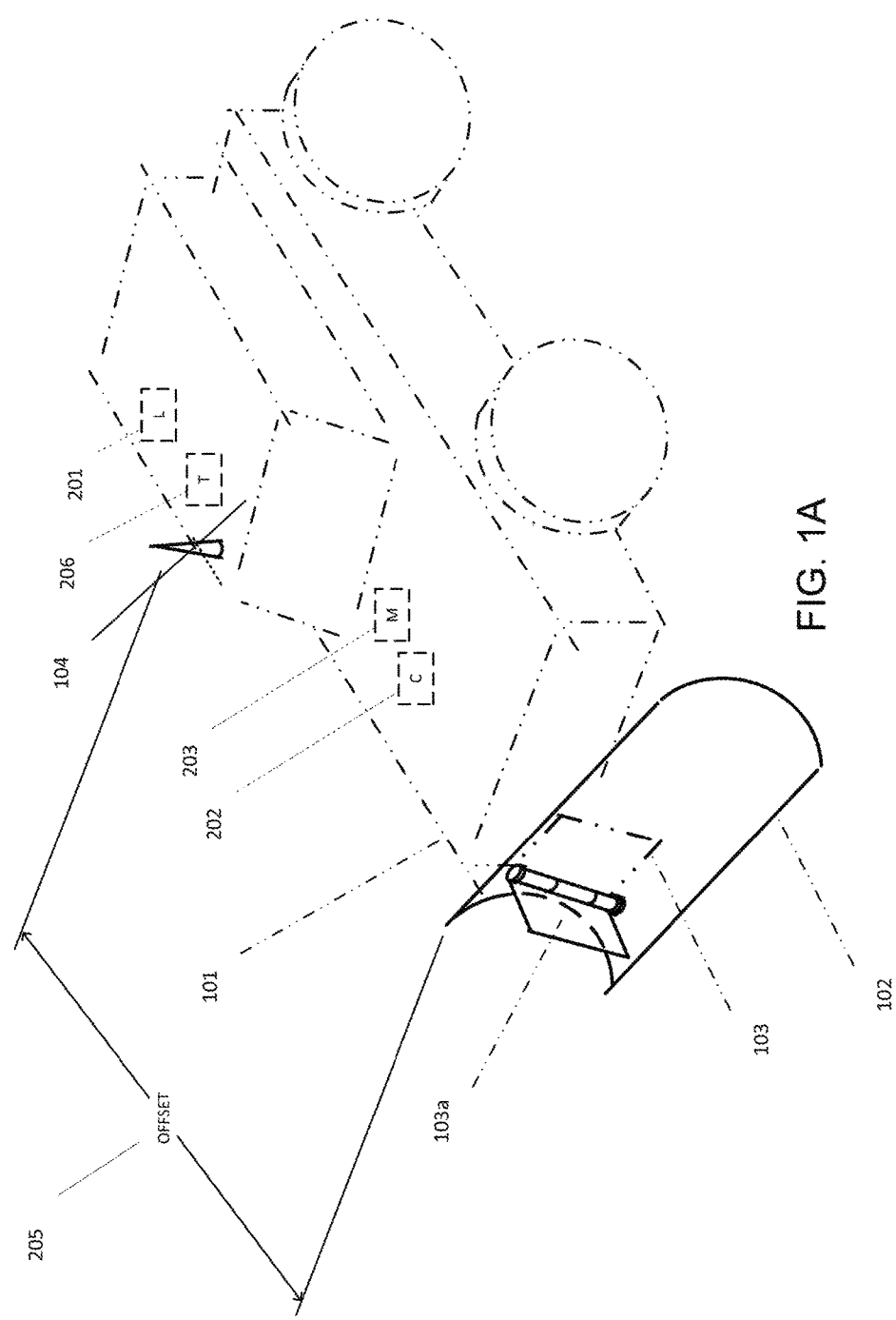
FIG. 1A illustrates a schematic perspective illustration of a snow removal vehicle with the first of three common forms of a snow diverter apparatus, a snow discharge diverter mounted on a snow plow blade in the snow discharge position shown with phantom lines and in a snow pushing position according to embodiments of the present inventions.

The plowing of streets and roadways in areas with snowy climates is typically done with a labor intensive manually operated snow removal apparatus mounted on a vehicle designed to push the snow off the roadway. A problem is that there may be areas near the roadway, such as, driveways, mailboxes, crosswalks, cross streets, and fire hydrants that should not be blocked or covered with discharged snow. The present invention includes a controller (with computer logic capabilities) to control a snow discharge diverter, a location detector (such as a Global Positioning Satellite or GPS system), a location detector antenna, and a memory to store data such as the locations of the predefined areas.

The present invention is used in conjunction with a snow removal vehicle and will solve the problems present in the current technology. The GPS system is used initially (before the snow falls) to determine the precise locations of the predefined areas for which it would be desirable to avoid discharging snow on or in front of. The predefined area locations are recorded in a list of predefined areas and are stored in the memory. The same GPS system is used during the snow removal operation (after the snow falls) to continually locate the moving snow removal vehicle or more precisely locate the location detector antenna on the snow removal vehicle, and check its proximity to the location of each of the predefined areas.

The GPS system may also include an augmentation system to improve the accuracy of the GPS system. The greater the accuracy, the more precise the calculation of the activation distance between the snow removal vehicle and each of the predefined areas. The calculations are done in the controller which controls the position of the snow discharge diverter. The two positions are snow discharging and snow pushing. The controller is also connected to the location detector and receives updated signals of the location of the snow removal vehicle, or more precisely, of the location detector antenna. When the snow removal vehicle is less than the activation distance from one of the predefined area locations, the present invention then causes the snow discharge diverter apparatus to switch from the snow discharging position to the snow pushing position. The normally discharged snow temporarily cumulates in front of the snow discharger diverter apparatus in the snow pushing position until the predefined area is passed. Then the apparatus changes the snow discharge diverter apparatus back to the snow discharging position. The snow that cumulated during the snow pushing position plus any new snow encountered after passing the area is then discharged off the street or roadway in the snow discharging position. If the area was a driveway, it will be left free, or relatively free, of the discharged snow. Every time the snow discharge diverter apparatus changes position the event may optionally be recorded. The minimum information recorded is the precise time of the event and the precise location of the location device antenna when the event occurred. That information can then be used for management information. For example the event information along with the list of predefined areas and objects can be used to construct a simulation of the path and actions of the snow removal vehicle, or fleet of vehicles, for management purposes. If the snow removal organization decided to charge for the service, then the recording would provide a record of the service provided which would be a basis for a customer billing system.

Snow discharge diverter apparatuses may be in three exemplary forms as in the following exemplary embodiments:
1. A snow diverter device, typically attached to or integrated into the design of a snow plow blade that allows the diverter to change between a snow discharging position and a snow pushing position;
2. A snow plow whose angle of attack is changed to allow the plow blade to change between a snow discharging position and a snow pushing position; or
3. A snow blower device in which the angle of the discharge output port is changed to allow the apparatus to change between a snow discharging position and a snow pushing position.

In practice most snow removal vehicle drivers typically do not use adjustable manually operated or voice operated snow discharge diverter apparatuses for the following two reasons:
1. The manual or voice operated activity is labor intensive and disrupts the driver with too many additional tasks to perform when driving the snow removal vehicle which presents a safety problem; and
2. Too many additional tasks to be performed might require a more skilled driver with a higher operating cost.

FIG. 1A illustrates a schematic perspective illustration of a snow removal vehicle 101 with the first form of a snow diverter apparatus, a snow discharge diverter mounted on a snow plow blade 102 in the snow discharge position 103 shown with phantom lines and in a snow pushing position 103a according to embodiments of the present inventions. The snow removal vehicle with the first form of a snow diverter apparatus has an attached plow blade 102, a diverter blade in the snow discharge position 103 and in a snow pushing position 103a, a location detector shown with dashed lines and labeled with the letter "L" 201, a location detector antenna 104, a controller shown with dashed lines and labeled with the letter "C" 202, a controller memory shown with dashed lines and labeled with the letter "M" 203. The offset (205) is the distance between the location detector antenna and the snow discharge diverter when in the discharge position. This distance is required to correct for the difference between the location detector antenna and the snow discharge diverter. A trim control system shown with dashed lines and labeled with the letter "T" 206 is used to manually correct the calculations of the activation and deactivation distances for the snow diverter apparatus.

FIG. 1B illustrates a schematic perspective illustration of a snow removal vehicle 101 with the second form of a snow diverter apparatus, a rotatable snow plow blade in the snow discharge position shown with phantom lines 102 and in the snow pushing position 102a according to embodiments of the present inventions. A snow removal vehicle 101 with the second form of a snow diverter apparatus has an attached plow blade whose angle may be changed between a snow discharging position 102 and a snow pushing position 102a, a location detector shown with dashed lines and labeled with the letter "L" 201, a location detector antenna 104, a controller shown with dashed lines and labeled with the letter "C" 202, a controller memory shown with dashed lines and labeled with the letter "M" 203, and a trim control system shown with dashed lines and labeled with the letter "T" 206. The offset (205) is the distance between the location detector antenna and the snow discharge diverter when in the discharge position.

Figure 1C:
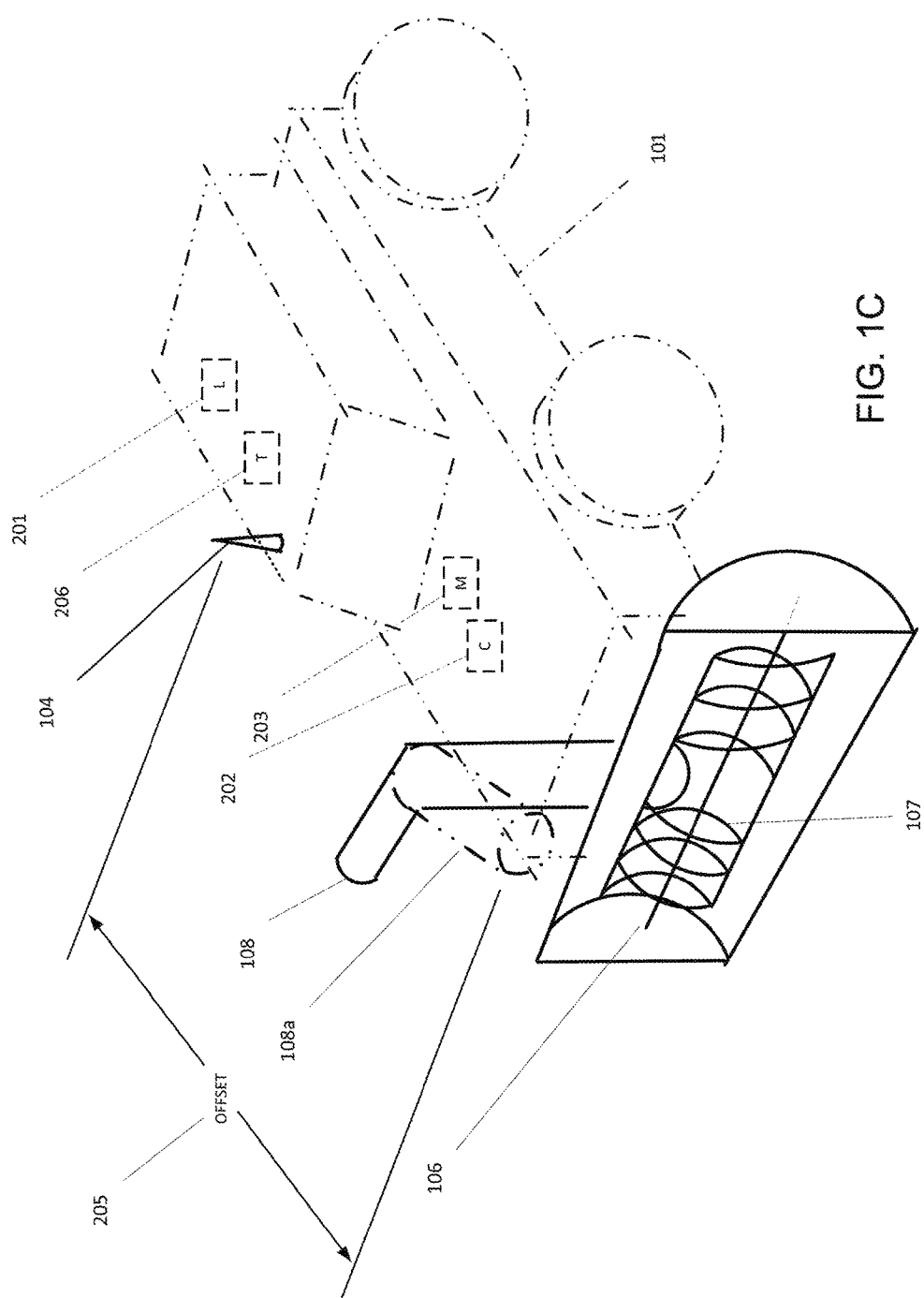
FIG. 1C illustrates a schematic perspective illustration of a snow removal vehicle with the third form of a snow diverter apparatus, an auger driven snow blower with the discharge port in the snow discharge position and in the snow pushing position shown with phantom lines according to embodiments of the present inventions.

FIG. 1C illustrates a schematic perspective illustration of a snow removal vehicle 101 with the third form of a snow diverter apparatus, an auger 107 driven snow blower 106 with the discharge port in the snow discharge position 108 and in the snow pushing position shown with phantom lines 108a according to embodiments of the present inventions. A location detector shown with dashed lines and labeled with the letter "L" 201, a location detector antenna 104, a controller shown with dashed lines and labeled with the letter "C" 202, a controller memory shown with dashed lines and labeled with the letter "M" 203, and a trim control system shown with dashed lines and labeled with the letter "T" 206. The offset (205) is the distance between the location detector antenna and the snow discharge diverter when in the discharge position.

Figure 2:
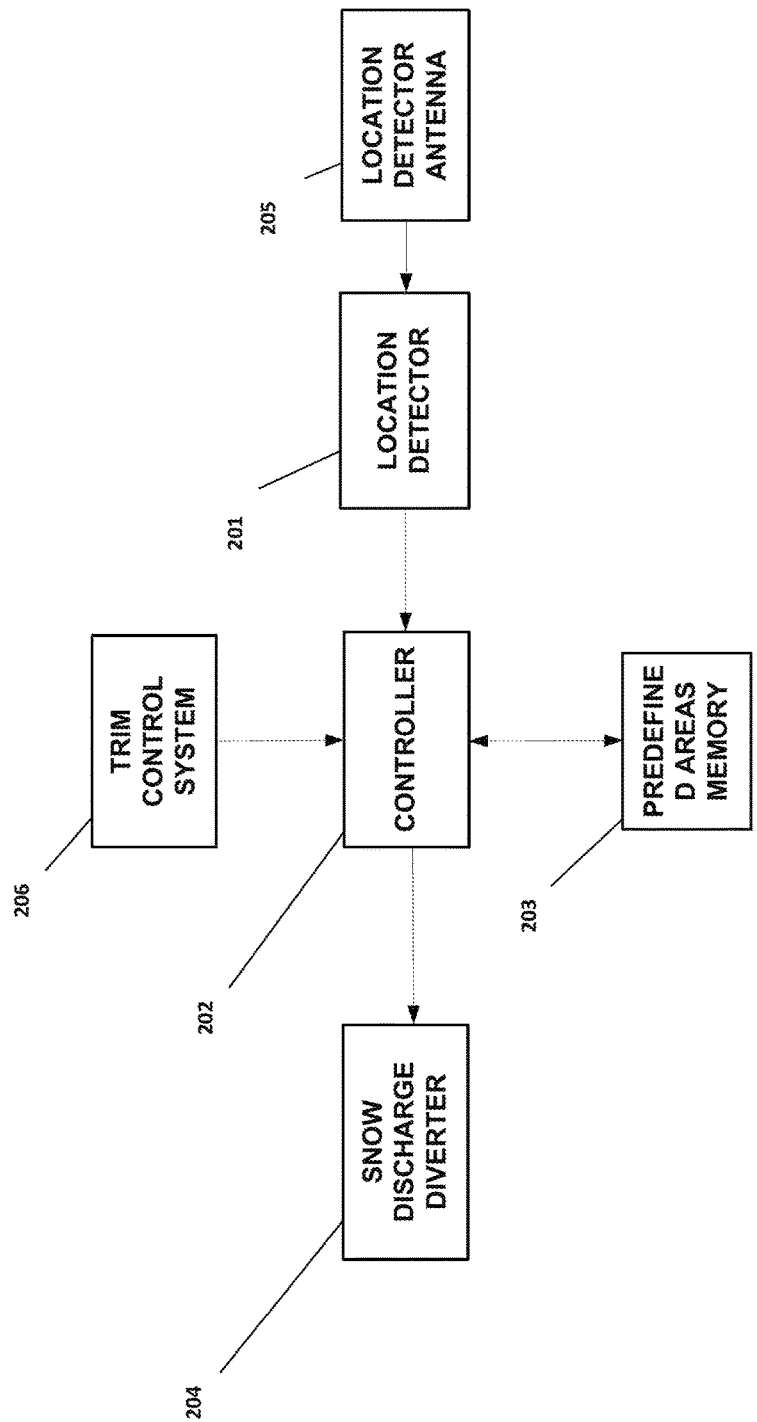
FIG. 2 illustrates a block diagram view of the elements of the apparatus and method according to embodiments of the present inventions.

FIG. 2 illustrates a block diagram view of the elements that the present invention uses to avoid throwing plowed snow on predefined areas. The elements include a snow discharge diverter 204, a location detector 201, a location detector antenna 205, an predefined areas memory 203, a controller 202, and a trim control system 206.

Figure 3A:
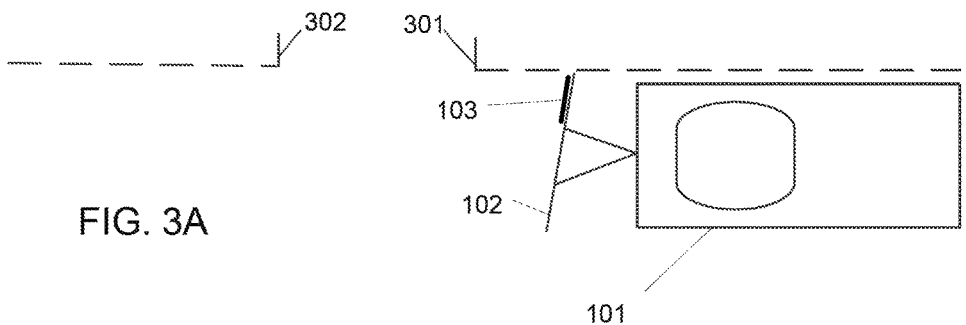
FIGS. 3A-3C illustrates a series of schematic illustrations of the operation of the first form of a snow discharge diverter apparatus according to embodiments of the present inventions.
Figure 3B:
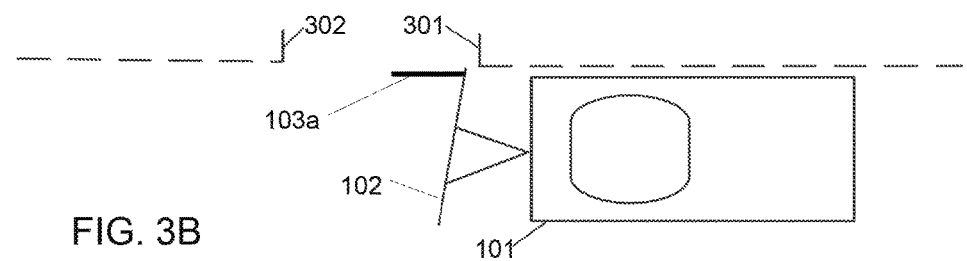
Figure 3C:
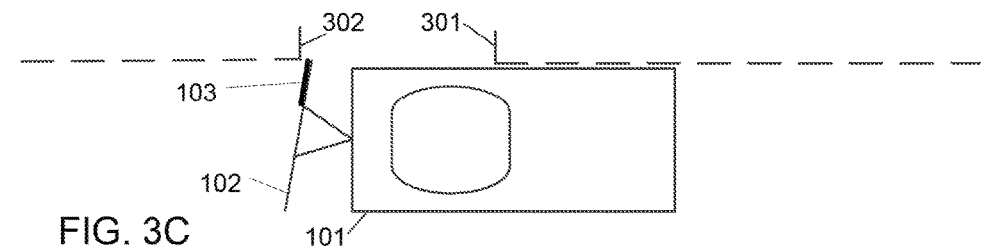

FIGS. 3A-3C illustrates a series of schematic illustrations of the operation of the first form of the snow diverter apparatus which shows in FIG. 3A a snow removal vehicle 101 prior to detecting the start point 301 of a predefined area with snow discharge diverter 103 in the snow discharging position 103 flush with the snow plow blade 102 then in FIG. 3B after passing the start point 301 of the predefined area with the snow discharge diverter in the snow pushing position with the discharge diverter 103a approximately perpendicular to the snow plow blade 102 and in FIG. 3C after passing the end point of the predefined area 302 with snow discharge diverter returned to the snow discharging position 103.

Figure 3D:
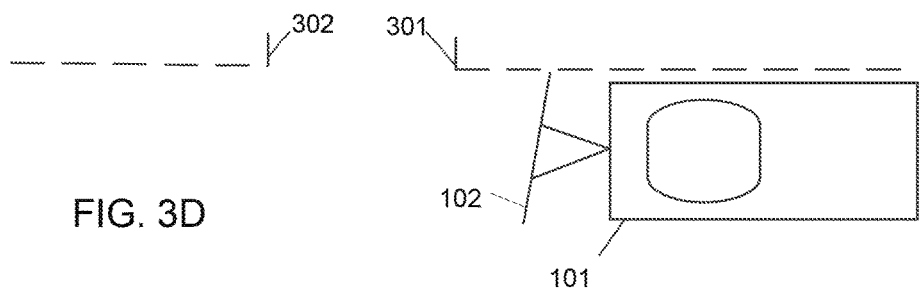
FIGS. 3D-3F illustrates a series of schematic illustrations of the operation of the second form of a snow discharge diverter apparatus according to embodiments of the present inventions.
Figure 3E:
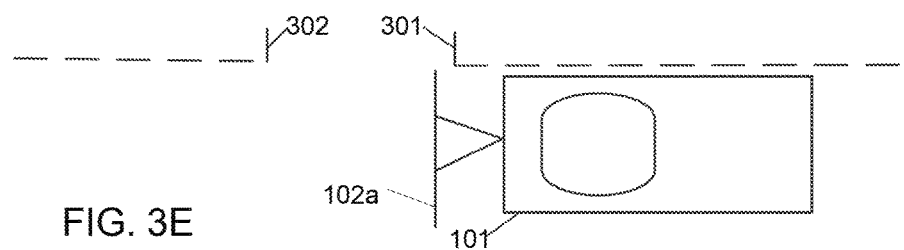
Figure 3F:
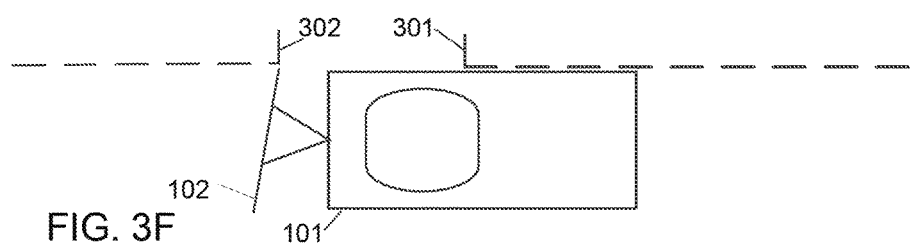

FIGS. 3D-3F illustrates a series of schematic illustrations of the second form of the snow discharge diverter which shows in FIG. 3D a snow removal vehicle 101 prior to detecting the start point 301 of a predefined area with snow plow blade 102 in the snow discharging position 102 and in FIG. 3E after passing the start point 301 of the predefined area with the snow plow blade in the snow pushing position 102a and then in FIG. 3F after passing the end point 302 of the predefined area with snow plow blade returned to the snow discharging position 102.

Figure 3G:
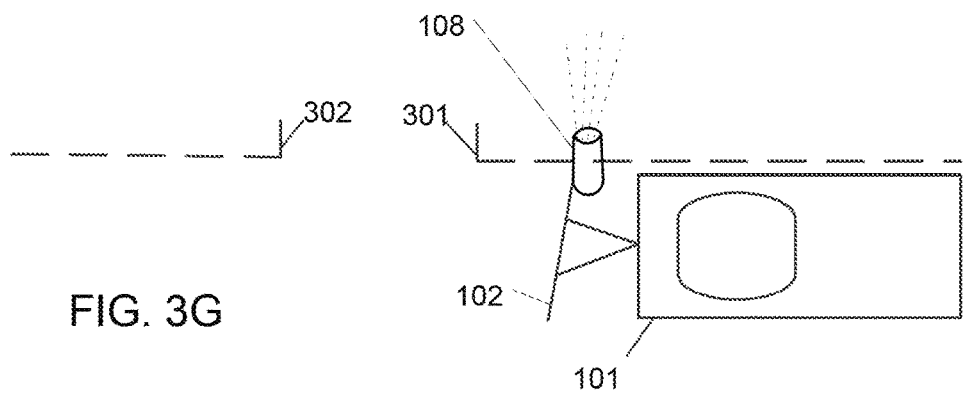
FIGS. 3G-3I illustrates a series of schematic illustrations the operation of the third form of a snow discharge diverter apparatus according to embodiments of the present inventions.
Figure 3H:
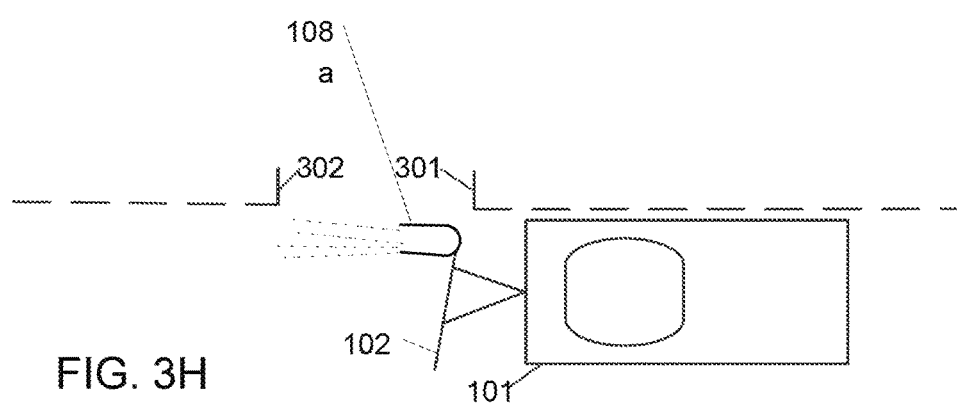
Figure 3I:
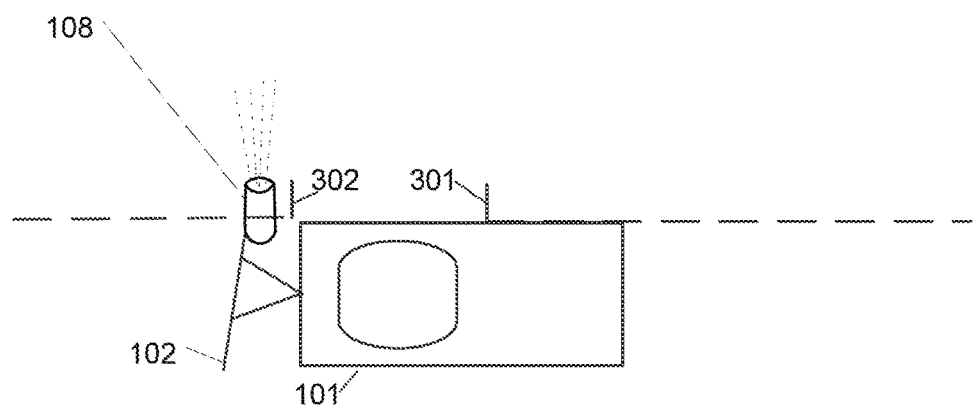

FIGS. 3G-3I illustrates a series of schematic illustrations of the third form of the snow discharge diverter which shows in FIG. 3G a snow removal vehicle 101 prior to detecting the start point 301 of an area with the snow discharge port in the snow discharging position 108 and in FIG. 3H after passing the start point 301 of the area with the snow discharge port in the snow pushing position 108a and then in FIG. 3I after passing the end point 302 of the area with the snow discharge port returned to the snow discharging position 108.

Figure 4:
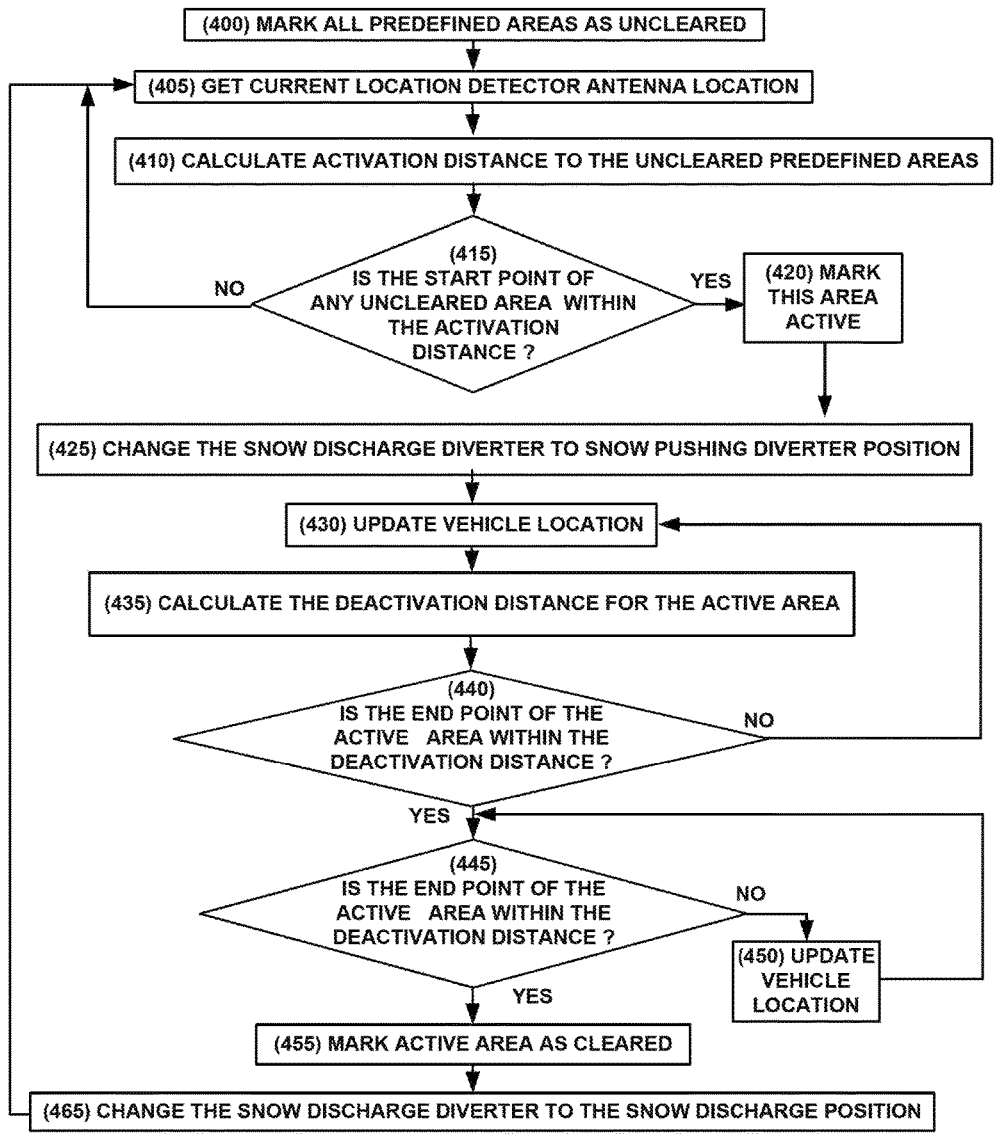
FIG. 4 illustrates a logic flowchart of the operational logic of the present invention according to embodiments of the present inventions.

FIG. 4 illustrates a logic flowchart of the operational logic of the present invention. Step 400 marks all predefined areas as uncleared. Step 405 gets the current location detector antenna location. Step 410 calculates the activation distance to the selected areas. Step 415 determines if the start point of any uncleared area is within the activation distance. If no the logic cycles back to step 405. If yes, step 420 marks this area as active. Step 425 changes the snow discharge diverter to snow pushing diverter position. Step 430 updates the vehicle location. Step 435 calculates the deactivation distance for the active area. Step 440 determines if the end point of the active area is within the deactivation distance. If no, the logic cycles back to step 430. If yes, step 445 determines if the end point of the active area is within the deactivation distance. If no, step 450 cycles back to step 445. If yes, step 455 marks active area as cleared. Step 465 changes the snow discharge diverter to the snow discharge position and cycles back to step 405. Note: an area may be marked uncleared, active, or cleared.

Figure 5:
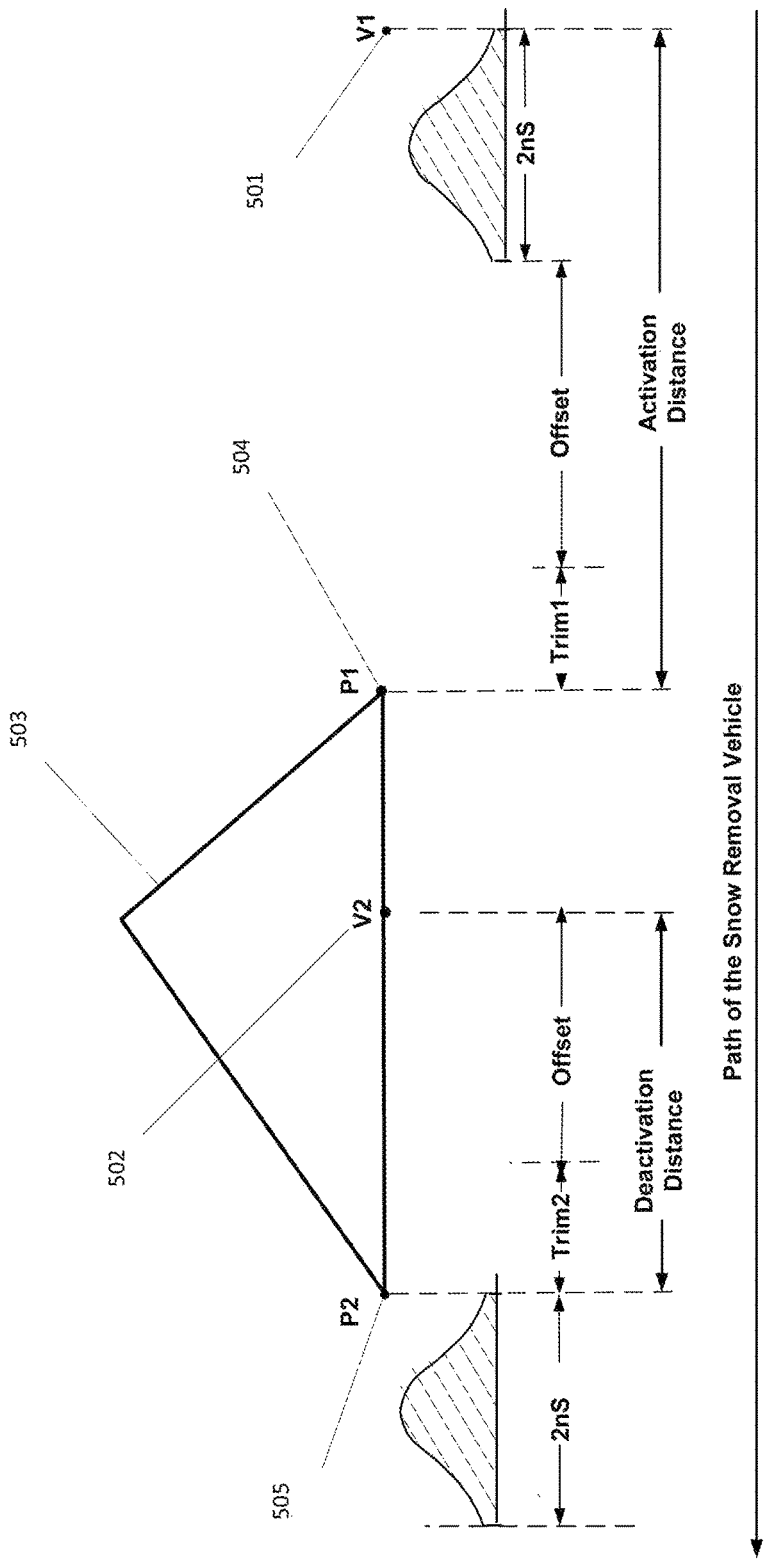
FIG. 5 illustrates a schematic illustration of the information needed to calculate the activation and deactivation distances according to embodiments of the present inventions.

FIG. 5 illustrates a diagram of the components and their relationship needed to calculate the Activation and Deactivation Distances. When the location detector antenna is at point V1 501, (a distance $Trim_1$+the antenna Offset+2 nS) from the starting point P1 504 of the area 503 the snow discharge diverter apparatus is changed to the snow pushing position. When the vehicle is at point V2 502, ($Trim_2$+the antenna offset distance) from the ending point P2 505 then the snow discharge diverter apparatus is changed to the snow discharging position. It should be noted that although not obvious, the random variable, modeled by the normal distribution, is not used in the calculation of the deactivation distance. This is because we want to be certain that the snow discharge diverter is not changed back to the discharge position until we are approximately 100% sure that we have passed the finish point of the area. As used herein, Trim is a manual correction that may be applied by the snow removal vehicle driver to correct for any inaccuracies in the calculation of the activation and deactivation distances. Such inaccuracies could arise from any delay or latency in the mechanisms used to change the snow discharge diverter positions. The manually adjusted $Trim_1$ is a fine tuning of the calculated location the snow discharge diverter actually changes to the pushing position. $Trim_2$ is a fine tuning of the calculated location the snow discharge diverter actually changes to the discharge position.

Calculation of the Activation and Deactivation Distances

The calculation of the activation distance, as seen in FIG. 5, as a function of:

the trim ($Trim_1$) determined by the snow plow vehicle driver, the offset distance between the location device antenna and the snow discharge diverter apparatus, the accuracy rating of the location detector, and the number of standard deviations selected prior to the snow plow operation.

The activation distance for the area defined by starting point P1, in FIG. 5A, is calculated as follows:

$$\text{Activation Distance} = TRIM_1 + OFFSET + 2\,nS \quad \text{(equation 1)}$$

Where:

$TRIM_1$=the trim control system results used in the activation distance calculation. Note: $TRIM_1$ results may be positive or negative. $TRIM_1$ is anticipated to be a manual trim control system OFFSET=the distance between the location detector antenna and the snow discharge diverter apparatus.

S=the standard deviation value specified in the specifications for the location detector accuracy rating measured in feet n=the number of standard deviations plus and minus from the mean desired as a buffer to account for the accuracy of the location detector device When the antenna is at point V1 (in FIG. 5), which is at the calculated activation distance from the start of the area at point P1, the snow discharge diverter apparatus is changed to the snow pushing position.

The entire range of 2*n*S is included in the activation distance calculation because the true location could be on both sides of the mean and we want to make sure that the snow discharge diverter apparatus is fully in the snow pushing position at or before the time it arrives at the starting point, P1 in FIG. 5, of the area.

The calculation of the deactivation distance, in FIG. 5, for the area defined by ending point P2 in FIG. 5 is more non-obvious than the calculation of the activation distance.

$$\text{Deactivation Distance} = TRIM_2 + OFFSET \quad \text{(equation 2)}$$

Where:

$TRIM_2$=the trim control system results used in the deactivation distance calculation (Note: $TRIM_2$ results may be positive or negative. $TRIM_2$ is anticipated to be a manual trim control system) and:

When the location detector antenna is at a distance $Trim_2$+Offset from the ending point P2 505 in FIG. 5 then the snow discharge diverter apparatus is changed to the snow discharging position. Although not obvious, the random variable, modeled by the normal distribution, is not used in the calculation of the deactivation distance. This is because when the location detector antenna is at point V2 in FIG. 5, we want to be approximately 100% certain that the snow discharge diverter does not change to the snow discharge position until after it passes the ending point of the area P2.

That is why the entire range of 2*n*S is excluded in the deactivation distance calculation.

If multiple areas caused the snow removal vehicle to be in the snow pushing position then the snow discharge diverter is not switched back to the snow discharging position until the snow removal vehicle has reached the deactivation distance of all areas that have caused the snow discharge diverter apparatus to be in the snow pushing position.

Predefining the Areas to Avoid Discharging Snow

The process of initially identifying the areas to avoid blocking or covering with discharged snow is anticipated to be accomplished manually (before the snow falls) in a vehicle with a GPS device.

There may be one button, on a device that the operator pushes to signal the start of an area and a second button to signal the ending point of the same area. Or both functions may be combined into one button. There may also be a keyboard for the operator to record the owner of the area (i.e. the owner of the driveway or of the mailbox). This information may be used for reporting the work done or for an optional billing system. There may also be a recording unit to record the work done. The process could be further automated with cameras and intelligent image processing to automatically recognize the areas. The process could be even further automated with the addition of voice recognition hardware and software to eliminate the need for a keyboard.

It is anticipated that municipalities would predefine all the areas (such as driveways, mailboxes and fire hydrants) that are in the areas they currently plow. However, plowing in unincorporated areas or private streets is typically done by private contractors. With the present invention, these contractors will have the option of charging a base fee for plowing as is done now, and an extra charge to avoid throwing snow on a home owner's driveway or mailbox. The present invention provides the necessary information for an optional billing system.

In summary, the present invention is an improved Snow Discharge Diverter Apparatus and method for avoiding the discharge of snow on certain predefined areas from a snow removal vehicle while removing snow from streets and roadways. No other prior art has been found which describes an apparatus or method that includes a snow removal vehicle with a snow diverter apparatus in combination with a location detector, a controller accessible memory, and a controller, as described in the claims of the present invention, which is a new and improved apparatus and method for avoiding the throwing the discharged snow on or in front of predefined areas without the need for human intervention. In addition, the method allows the use of economical GPS devices of less accuracy or more expensive GPS devices of greater accuracy. The apparatus is safer to operate than any of the manually operated or voice operated apparatuses since there is no need for human attention or distracting tasks to perform for each area. The fact that fewer tasks are required to accomplish the goal, means that a lower skill level is required to do the job resulting in an economical savings over the prior art. Finally, there are no radio transmitters needed to be installed and maintained for every area defined.

Since other modifications and changes, in the calculation of the activation distance to an area, or in the calculation of the deactivation distance for an area, varied to fit particular operating requirements and environments will be apparent to those skilled in the art, the method of calculating these distances and times are not considered limited to the examples chosen for purposes of disclosure, and covers all changes and modifications which do not constitute departures from the true spirit and scope of this invention. Having thus described the invention, what is desired to be protected by Letters Patent is presented in the subsequently appended claims.

The present invention may be described as an improved method to avoid throwing discharged snow on certain predefined areas such as driveways, mailboxes, crosswalks, cross streets, or fire hydrants from a snow removal vehicle without the need of human intervention. Regardless of the form of the snow discharge diverter apparatus (diverter blade, change angle of the blade, or change angle of the snow blower output port), the snow discharge diverter apparatus typically has two operating positions, a snow discharging position and a snow pushing position.

None of the known prior references, as mentioned herein, use a vehicle location detector such as a global positioning satellite system (GPS) in conjunction with a snow discharge diverter apparatus to describe an apparatus or method that would solve the stated problem of avoiding the throwing of snow on predefined areas without disrupting the drivers attention or requiring additional driver skills while removing snow from streets without manual intervention from the driver.

The present inventions differ from the prior art in a number ways: The present inventions do not require manual interaction from the driver to avoid throwing snow on the predefined areas while removing the snow; and the present inventions do not lift the plow blade but temporarily diverts the flow of plowed snow while in front of the predefined areas thus not leaving unplowed snow on or in front of those areas.

The present inventions also eliminates the need for radio transmitters at the start anf finish of each of the plurality of predefined areas.

Therefore the present inventions can be seen as a new improved apparatus and method of removing snow from roadways while not throwing the discharged snow on or in front of predefined areas which should not be covered with snow without manual intervention from the driver.

No prior art leads one to try or describes a apparatus or method that includes a snow removal vehicle with a snow diverter apparatus in combination with a location detector, a controller accessible memory, and a controller, as described in the claims of the present invention, which is a new and improved apparatus and method for avoiding the throwing the discharged snow on or in front of predefined areas without the need for human intervention.

As used herein, the terms "snow removal vehicle" refers to a vehicle with a snow discharge diverter apparatus to remove snow from surfaces such as streets, roadways, highways and parking lots.

As used herein, the terms "snow discharge diverter apparatus" refers to any one of three common forms of a snow removal device or to any other vehicle mounted apparatus designed to remove snow from the roadways. The three forms are: a snow diverter device typically attached to or integrated into the design of the snow plow blade, a snow plow blade apparatus whose angle of attack is changed between a snow discharging position and a snow pushing position, or a snow blower apparatus whose output port is changed between a snow discharging position and a snow pushing position.

As used herein, the terms "location detector" refers broadly to a Global Positioning System (GPS) or any land based or space based vehicle location system.

As used herein, the terms "location detector antenna" refers broadly to a Global Positioning System (GPS) antenna or any land based or space based vehicle location system that requires an antenna to receive an external signal. The antenna may be installed at a different location on the snow removal vehicle then the location detector device and at an offset distance from the snow discharge diverter.

As used herein, the terms "activation distance" refers to the distance calculation between the location device antenna and the starting point of one of the plurality of predefined areas and defines the point at which the snow discharge diverter apparatus changes to the snow pushing position.

As used herein, the terms "deactivation distance" refers to the distance calculation between the location device antenna and the ending point of one of the plurality of predefined areas and defines the point at which the snow discharge diverter apparatus changes to the snow discharging position.

As used herein, the terms starting point refers to the closer of the two points, defined for each area, to the snow removal vehicle as the vehicle approaches the predefined area. By default the further point refers to the ending point of that area.

As used herein, the terms "list of locations of a plurality of predefined areas" refer to the set of information that includes, but not limited to, the longitude and latitude of the start and end points of each of the areas for which it is desired to keep free of plowed snow. The data may also include other identifying attributes such as type of area (e.g. driveway, mailbox, crosswalk, cross street, or fire hydrant), the closest address, the owner of the area, or even visual images of the area. The data is collected one time with the assistance of a GPS device, before any snow removal is needed, and stored in a controller accessible memory that can be accessed by the controller.

As used herein, the term "memory" typically refers to a controller accessible memory such as random access memory, RAM, or secondary memory such as a hard drive, or any other form of controller accessible memory all of which can be accessed by the controller.

As used herein, the terms "controller" refers to a processing unit that manages access to the memory, is able to process programmed instructions, to send signals to activate or deactivate the snow discharge diverter apparatus, and to record information on the memory.

As used herein, the terms "location data" refers to the information stored in memory about the location of each of the predefined areas, such as the longitude and latitude of the starting and ending points of each of the areas.

As used herein, the terms "billing information" refers to the unique identifier of the area and the name and billing address of the owner of the area and the date and time of the service performed. In addition to keeping a record of the actions of the snow plow vehicle and driver, this information may also be used for billing purposes in the event that the snow plow service is billed to the owner of the area.

As used herein, the terms "augmentation system" refers to a GPS accuracy enhancement of such systems as Nationwide Differential GPS System (NDGPS), or Wide Area Augmentation System (WAAS), or Continuously Operating Reference Stations (CORS) or Global Differential GPS (GDGPS), or International GNSS Service (IGS), or any accuracy enhancement system for GPS systems.

As used herein, the terms "snow pushing position" refers to the configuration of a snow discharge diverter apparatus that causes the removed snow to cumulate in front of the snow discharge diverter apparatus.

As used herein, the terms "snow discharging position" refers to the configuration of a snow discharge diverter apparatus that causes the removed snow to be discharged off of the street or roadway.

As used herein, the term "event" refers to the point in time and location of the location device antenna every time the snow discharge diverter apparatus changes position.

As used herein, the term "trim" refers to a correction distance that the person who is predefining an area or the driver of a snow removal vehicle may use to adjust or fine tune the activation distance or deactivation distance. This system is manually controlled and is anticipated to be set after the first few predefined areas have been passed at an average snow plow vehicle speed.

The snow discharge diverter apparatus and method determines when a snow diverter apparatus should be switched between the snow discharging position and the snow pushing position without the need for human intervention. The apparatus and method also relieves the snow removal vehicle driver of the labor intensive tasks of continually changing the positions of the snow diverter apparatus.

The signal processing techniques disclosed herein with reference to the accompanying drawings can be implemented on one or more digital signal processors (DSPs) or other microprocessors. Nevertheless, such techniques could instead be implemented wholly or partially as hardwired circuits. Further, it is appreciated by those of skill in the art that certain well known digital processing techniques are mathematically equivalent to one another and can be represented in different ways depending on choice of implementation.

Any letter designations such as (a) or (b) or (1) or (2) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. An apparatus for snow removal diversion, comprising:
a snow discharge diverter configured to change a flow of discharged snow from a snow removal vehicle connected thereto, said snow discharge diverter selectably movable between at least a snow discharging diverter position and a snow pushing diverter position, the snow discharging diverter position arranged to direct the flow of discharged snow to at least one side of a path of the snow removal vehicle, the snow pushing diverter position arranged to cause the flow of discharged snow to cumulate in a leading front side of the snow discharge diverter in a snow pushing position relative to the path of the snow removal vehicle;
a location detector antenna mounted on the snow removal vehicle at an offset distance from the snow discharge diverter;
a location detector operatively coupled to the location detector antenna to read an antenna location of the location detector antenna;
a predefined areas memory storing a list of a plurality of predefined areas for avoiding discharging snow, said list comprising a starting point location and an ending point location of each of the areas; and
a controller operatively coupled to the location detector, the predefined areas memory, and the snow discharge diverter and configured to control a position of the snow discharge diverter among the snow discharging diverter position and the snow pushing diverter position based on the antenna location and the list of the plurality of predefined areas for avoiding discharging snow, wherein the controller is constructed and arranged to:
(a) receive a first signal from the location detector, said first signal comprising updated location data of the location detector antenna;
(b) receive a second signal from the memory, said second signal comprising the location data of the plurality of predefined areas;
(c) calculate an activation distance from the location detector antenna to the start of each of the plurality of predefined areas said calculation using the antenna location and using a current snow removal vehicle speed and using the starting point location and the ending point location of the predefined areas;
(d) transmit an activation signal to the snow discharge diverter to cause the snow discharge diverter to change to the snow pushing diverter position when the antenna location is within the activation distance of any one of the predefined areas;
(e) calculate a deactivation distance from the antenna location to the ending point location of each of the plurality of predefined areas said calculation based on at least the antenna location, the current snow removal vehicle speed, and the ending point location of the predefined areas; and
(f) transmit a deactivation signal to the snow discharge diverter to cause the snow discharge diverter to change to the snow discharging diverter position when the antenna location is within the deactivation distance of the ending point location of any one of the areas;
wherein the apparatus further comprises a snow removal auger; and wherein the diverter comprises a snow discharge chute operatively coupled to the snow removal auger.

2. An apparatus for snow removal diversion, comprising:
a snow discharge diverter configured to change a flow of discharged snow from a snow removal vehicle connected thereto, said snow discharge diverter selectably movable between at least a snow discharging diverter position and a snow pushing diverter position, the snow discharging diverter position arranged to direct the flow of discharged snow to at least one side of a path of the snow removal vehicle, the snow pushing diverter position arranged to cause the flow of discharged snow to cumulate in a leading front side of the snow discharge diverter in a snow pushing position relative to the path of the snow removal vehicle;
a location detector antenna mounted on the snow removal vehicle at an offset distance from the snow discharge diverter;
a location detector operatively coupled to the location detector antenna to read an antenna location of the location detector antenna;
a predefined areas memory storing a list of a plurality of predefined areas for avoiding discharging snow, said list comprising a starting point location and an ending point location of each of the areas; and
a controller operatively coupled to the location detector, the predefined areas memory, and the snow discharge diverter and configured to control a position of the snow discharge diverter among the snow discharging diverter position and the snow pushing diverter position based on the antenna location and the list of the plurality of predefined areas for avoiding discharging snow, wherein the controller is constructed and arranged to:
(a) receive a first signal from the location detector, said first signal comprising updated location data of the location detector antenna;
(b) receive a second signal from the memory, said second signal comprising the location data of the plurality of predefined areas;
(c) calculate an activation distance from the location detector antenna to the start of each of the plurality of predefined areas said calculation using the antenna location and using a current snow removal vehicle speed and using the starting point location and the ending point location of the predefined areas, wherein the calculation of the activation distance is further based on inputs regarding an accuracy rating of the location detector for improving the accuracy of the calculation;
(d) transmit an activation signal to the snow discharge diverter to cause the snow discharge diverter to change to the snow pushing diverter position when the antenna location is within the activation distance of any one of the predefined areas;
(e) calculate a deactivation distance from the antenna location to the ending point location of each of the plurality of predefined areas said calculation based on at least the antenna location, the current snow removal vehicle speed, and the ending point location of the predefined areas; and
(f) transmit a deactivation signal to the snow discharge diverter to cause the snow discharge diverter to change to the snow discharging diverter position when the antenna location is within the deactivation distance of the ending point location of any one of the areas.

3. The apparatus for snow removal diversion according to claim 2, wherein the diverter is a snow pushing blade.

4. The apparatus for snow removal diversion according to claim 2, wherein the apparatus further comprises a snow pushing blade; and wherein the diverter is operatively coupled near a curb side of the snow pushing blade.

5. The apparatus for snow removal diversion according to claim 2, wherein said snow discharge diverter is chosen from the group consisting of (i) a snow pushing blade, (ii) a snow pushing blade and diverter operatively coupled near a curb side of the snow pushing blade, and (iii) a snow removal auger and a snow discharge chute operatively coupled to the snow removal auger.

6. The apparatus for snow removal diversion according to claim 2, wherein the location detector comprises a global positioning satellite system receiver.

7. An apparatus for snow removal diversion, comprising:
a snow discharge diverter configured to change a flow of discharged snow from a snow removal vehicle connected thereto, said snow discharge diverter selectably movable between at least a snow discharging diverter position and a snow pushing diverter position, the snow discharging diverter position arranged to direct the flow of discharged snow to at least one side of a path of the snow removal vehicle, the snow pushing diverter position arranged to cause the flow of discharged snow to cumulate in a leading front side of the snow discharge diverter in a snow pushing position relative to the path of the snow removal vehicle;
a location detector antenna mounted on the snow removal vehicle at an offset distance from the snow discharge diverter;
a location detector operatively coupled to the location detector antenna to read an antenna location of the location detector antenna;
a predefined areas memory storing a list of a plurality of predefined areas for avoiding discharging snow, said list comprising a starting point location and an ending point location of each of the areas; and
a controller operatively coupled to the location detector, the predefined areas memory, and the snow discharge diverter and configured to control a position of the snow discharge diverter among the snow discharging diverter position and the snow pushing diverter position based on the antenna location and the list of the plurality of predefined areas for avoiding discharging snow, wherein the controller is constructed and arranged to:
(a) receive a first signal from the location detector, said first signal comprising updated location data of the location detector antenna;
(b) receive a second signal from the memory, said second signal comprising the location data of the plurality of predefined areas;
(c) calculate an activation distance from the location detector antenna to the start of each of the plurality of predefined areas said calculation using the antenna location and using a current snow removal vehicle speed and using the starting point location and the ending point location of the predefined areas;
(d) transmit an activation signal to the snow discharge diverter to cause the snow discharge diverter to change to the snow pushing diverter position when the antenna location is within the activation distance of any one of the predefined areas;
(e) calculate a deactivation distance from the antenna location to the ending point location of each of the plurality of predefined areas said calculation based on at least the antenna location, the current snow removal vehicle speed, and the ending point location of the predefined areas; and
(f) transmit a deactivation signal to the snow discharge diverter to cause the snow discharge diverter to change to the snow discharging diverter position when the antenna location is within the deactivation distance of the ending point location of any one of the areas;
wherein the calculation of the activation distance and of the deactivation distance by the controller is further based on inputs of a trim correction.

8. The apparatus for snow removal diversion according to claim 7, wherein the diverter is a snow pushing blade.

9. The apparatus for snow removal diversion according to claim 7, wherein the apparatus further comprises a snow pushing blade; and wherein the diverter is operatively coupled near a curb side of the snow pushing blade.

10. The apparatus for snow removal diversion according to claim 7, wherein said snow discharge diverter is chosen from the group consisting of (i) a snow pushing blade, (ii) a snow pushing blade and diverter operatively coupled near a curb side of the snow pushing blade, and (iii) a snow removal auger and a snow discharge chute operatively coupled to the snow removal auger.

11. The apparatus for snow removal diversion according to claim 7, wherein the location detector comprises a global positioning satellite system receiver.

12. The apparatus for snow removal diversion according to claim 7, further comprising a trim control system which is able to send a signal to the controller for adjusting the value of the activation and deactivation distances.

13. An apparatus for snow removal diversion, comprising:
a snow discharge diverter configured to change a flow of discharged snow from a snow removal vehicle connected thereto, said snow discharge diverter selectably movable between at least a snow discharging diverter position and a snow pushing diverter position, the snow discharging diverter position arranged to direct the flow of discharged snow to at least one side of a path of the snow removal vehicle, the snow pushing diverter position arranged to cause the flow of discharged snow to cumulate in a leading front side of the snow discharge diverter in a snow pushing position relative to the path of the snow removal vehicle;
a location detector antenna mounted on the snow removal vehicle at an offset distance from the snow discharge diverter;
a location detector operatively coupled to the location detector antenna to read an antenna location of the location detector antenna;
a predefined areas memory storing a list of a plurality of predefined areas for avoiding discharging snow, said list comprising a starting point location and an ending point location of each of the areas; and
a controller operatively coupled to the location detector, the predefined areas memory, and the snow discharge diverter and configured to control a position of the snow discharge diverter among the snow discharging diverter position and the snow pushing diverter position based on the antenna location and the list of the plurality of predefined areas for avoiding discharging snow, wherein the controller is constructed and arranged to:
(a) receive a first signal from the location detector, said first signal comprising updated location data of the location detector antenna;
(b) receive a second signal from the memory, said second signal comprising the location data of the plurality of predefined areas;
(c) calculate an activation distance from the location detector antenna to the start of each of the plurality of predefined areas said calculation using the antenna location and using a current snow removal vehicle speed and using the starting point location and the ending point location of the predefined areas;
(d) transmit an activation signal to the snow discharge diverter to cause the snow discharge diverter to change to the snow pushing diverter position when the antenna location is within the activation distance of any one of the predefined areas;
(e) calculate a deactivation distance from the antenna location to the ending point location of each of the plurality of predefined areas said calculation based on at least the antenna location, the current snow removal vehicle speed, and the ending point location of the predefined areas; and (f) transmit a deactivation signal to the snow discharge diverter to cause the snow discharge diverter to change to the snow discharging diverter position when the antenna location is within the deactivation distance of the ending point location of any one of the areas;

wherein the calculation of the activation distance and the deactivation distance by the controller is further based on the offset distance of the location detector antenna from the snow discharge diverter.

14. The apparatus for snow removal diversion according to claim 13, wherein the location detector comprises a global positioning satellite system receiver.

15. The apparatus for snow removal diversion according to claim 13, wherein the diverter is a snow pushing blade.

16. The apparatus for snow removal diversion according to claim 13, wherein the apparatus further comprises a snow pushing blade; and wherein the diverter is operatively coupled near a curb side of the snow pushing blade.

17. The apparatus for snow removal diversion according to claim 13, wherein said snow discharge diverter is chosen from the group consisting of (i) a snow pushing blade, (ii) a snow pushing blade and diverter operatively coupled near a curb side of the snow pushing blade, and (iii) a snow removal auger and a snow discharge chute operatively coupled to the snow removal auger.

18. An apparatus for snow removal diversion, comprising:
a snow discharge diverter configured to change a flow of discharged snow from a snow removal vehicle connected thereto, said snow discharge diverter selectably movable between at least a snow discharging diverter position and a snow pushing diverter position, the snow discharging diverter position arranged to direct the flow of discharged snow to at least one side of a path of the snow removal vehicle, the snow pushing diverter position arranged to cause the flow of discharged snow to cumulate in a leading front side of the snow discharge diverter in a snow pushing position relative to the path of the snow removal vehicle;
a location detector antenna mounted on the snow removal vehicle at an offset distance from the snow discharge diverter;
a location detector operatively coupled to the location detector antenna to read an antenna location of the location detector antenna;
a predefined areas memory storing a list of a plurality of predefined areas for avoiding discharging snow, said list comprising a starting point location and an ending point location of each of the areas; and
a controller operatively coupled to the location detector, the predefined areas memory, and the snow discharge diverter and configured to control a position of the snow discharge diverter among the snow discharging diverter position and the snow pushing diverter position based on the antenna location and the list of the plurality of predefined areas for avoiding discharging snow, wherein the controller is constructed and arranged to:
(a) receive a first signal from the location detector, said first signal comprising updated location data of the location detector antenna;
(b) receive a second signal from the memory, said second signal comprising the location data of the plurality of predefined areas;

(c) calculate an activation distance from the location detector antenna to the start of each of the plurality of predefined areas said calculation using the antenna location and using a current snow removal vehicle speed and using the starting point location and the ending point location of the predefined areas;

(d) transmit an activation signal to the snow discharge diverter to cause the snow discharge diverter to change to the snow pushing diverter position when the antenna location is within the activation distance of any one of the predefined areas;

(e) calculate a deactivation distance from the antenna location to the ending point location of each of the plurality of predefined areas said calculation based on at least the antenna location, the current snow removal vehicle speed, and the ending point location of the predefined areas; and (f) transmit a deactivation signal to the snow discharge diverter to cause the snow discharge diverter to change to the snow discharging diverter position when the antenna location is within the deactivation distance of the ending point location of any one of the areas;

wherein said apparatus further comprises a trim control system which is able to send a signal to the controller for adjusting the value of the activation and deactivation distances.

19. A method of controlling snow removal diversion, the method comprising the steps of:
providing a snow discharge diverter configured to change a flow of discharged snow from a snow removal vehicle connected thereto, said snow discharge diverter selectably movable between at least a snow discharging diverter position and a snow pushing diverter position, the snow discharging diverter position arranged to direct the flow of discharged snow to at least one side of a path of the snow removal vehicle, the snow pushing diverter position arranged to cause the flow of discharged snow to cumulate in a leading front side of the snow discharge diverter in a snow pushing position relative to the path of the snow removal vehicle;
providing a location detector antenna mounted on the snow removal vehicle at an offset distance from the snow discharge diverter;
providing a location detector operatively coupled to the location detector antenna for reading an antenna location of the location detector antenna, the location detector mounted in the snow removal vehicle, the location detector having an accuracy rating, the location detector antenna mounted on the snow removal vehicle, the antenna mounted at an offset distance from the snow discharge diverter, the antenna electronically connected to the location detector, the location detector having at least one location correction, the location corrections selected from a group consisting of a location detector accuracy rating and an antenna offset measurement and a manual trim adjustment;
providing a predefined areas memory storing a list of a plurality of predefined areas for avoiding discharging snow, said list comprising at least a starting point location and an ending point location of each of the areas;
providing a controller operatively coupled to the location detector, the predefined areas memory, and the snow discharge diverter and configured to control a position of the snow discharge diverter among the snow discharging diverter position and the snow pushing diverter position based on the antenna location and the list of the plurality of predefined areas for avoiding discharging snow and the location of the diverter; and performing, using the controller, the steps of:
(a) receiving a first signal from the location detector, said first signal comprising updated location data of the location detector antenna;
(b) receiving a second signal from the memory, said second signal comprising the location data of the plurality of predefined areas;
(c) calculating an activation distance from the location detector antenna to the start of each of the plurality of predefined areas said calculation using the antenna location and using a current snow removal vehicle speed and using the starting point location and the ending point location of the predefined areas;
(d) transmitting an activation signal to the snow discharge diverter to cause the snow discharge diverter to change to the snow pushing diverter position when the antenna location is within the activation distance of any one of the predefined areas;
(e) calculating a deactivation distance from the antenna location to the ending point location of each of the plurality of predefined areas said calculation based on at least the antenna location, the current snow removal vehicle speed, and the ending point location of the predefined areas; and
(f) transmitting a deactivation signal to the snow discharge diverter to cause the snow discharge diverter to change to the snow discharging diverter position when the antenna location is within the deactivation distance of the ending point location of any one of the areas.

20. The method of controlling snow removal diversion according to claim 19, wherein the snow discharge diverter is selected from the group consisting of (i) a snow pushing blade, (ii) a snow pushing blade and diverter operatively coupled near a curb side of the snow pushing blade, and (iii) a snow removal auger and a snow discharge chute operatively coupled to the snow removal auger.

21. The method of controlling snow removal diversion according to claim 19, wherein said location detector comprises a global positioning satellite system receiver.

22. The method of controlling snow removal diversion according to claim 19, wherein said step (c) of calculating an activation distance is further based on the manual trim adjustment; and wherein said step (e) of calculating the deactivation distance is further based on the manual trim adjustment.

23. The method of controlling snow removal diversion according to claim 22, wherein said method further comprises a step of a vehicle operator providing the manual trim adjustment.

24. The method of controlling snow removal diversion according to claim 23, wherein the controller is operatively coupled to a trim control system, the trim control system configured to enable the vehicle operator to make manual adjustments to the calculation of the activation distances and the deactivation distances.

25. The method of controlling snow removal diversion according to claim 19, wherein said step (c) of calculating an activation distance is further based on the offset distance of the location detector antenna from the snow discharge diverter; and wherein said step (e) of calculating a deactivation distance is further based on the offset distance of the location detector antenna from the snow discharge diverter.

26. The method of controlling snow removal diversion according to claim 19, wherein said step (c) of calculating the activation distance is further based on the location detector accuracy rating; and wherein said step (e) of calculating the deactivation distance is further based on the location detector accuracy rating.

* * * * *